United States Patent
Bas Sanchez et al.

(10) Patent No.: US 9,942,845 B2
(45) Date of Patent: Apr. 10, 2018

(54) TERMINATING SERVICE RESTRICTION FOR USER EQUIPMENTS HAVING POWER SAVING MODE

(71) Applicant: Telefonaktiebolaget LM Ericsson (Publ), Stockholm (SE)

(72) Inventors: Maria Esther Bas Sanchez, Madrid (ES); Peter Hedman, Helsingborg (SE); Hans Bertil Rönneke, Kungsbacka (SE); Juan Antonio Sanchez Herrero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 41 days.

(21) Appl. No.: 15/300,150

(22) PCT Filed: Jun. 4, 2014

(86) PCT No.: PCT/EP2014/061610
§ 371 (c)(1),
(2) Date: Sep. 28, 2016

(87) PCT Pub. No.: WO2015/185131
PCT Pub. Date: Dec. 10, 2015

(65) Prior Publication Data
US 2017/0188303 A1    Jun. 29, 2017

(51) Int. Cl.
*H04W 52/02* (2009.01)
*H04W 8/22* (2009.01)
(Continued)

(52) U.S. Cl.
CPC ......... *H04W 52/0216* (2013.01); *H04W 4/14* (2013.01); *H04W 8/18* (2013.01);
(Continued)

(58) Field of Classification Search
CPC ..... H04W 52/0216; H04W 4/14; H04W 8/18; H04W 8/22
See application file for complete search history.

(56) References Cited

U.S. PATENT DOCUMENTS 9,794,876 B2 * 10/2017 Choi .................. H04W 76/048

OTHER PUBLICATIONS

3GPP TS 23.682 V12.0.0 (Dec. 2013) 3rd Generation Partnership Project; Technical Specification Group Services and System Aspects; Architecture Enhancements to Facilitate Communications with Packet Data Networks and Applications (Release 12), Dec. 17, 2013 consisting of 33-pages.*

(Continued)

*Primary Examiner* — Siming Liu
(74) *Attorney, Agent, or Firm* — Christopher & Weisberg, P.A.

(57) ABSTRACT

Nodes and methods of operation thereof for use with a UE capable of utilizing power saving mode. A Home Location Register/Home Subscriber Server (HLR/HSS) network node includes a receiver configured to receive power saving mode status data relating to a user equipment, a status flag determiner configured to set a status flag based on the received power saving mode status data and to store the status flag in a memory, and an access controller configured to control access to the user equipment by a terminating service originating in a Circuit Switched domain and/or an Internet Protocol Multimedia Subsystem domain of the telecommunications network, in which access is controlled based on the stored status flag. A Serving General Packet Radio Service Support Node/Mobile Management Entity (SGSN/MME) network node is also provided.

34 Claims, 6 Drawing Sheets

(51) Int. Cl.
H04W 48/02 (2009.01)
H04W 4/14 (2009.01)
H04W 8/18 (2009.01)

(52) U.S. Cl.
CPC .......... *H04W 8/22* (2013.01); *H04W 48/02* (2013.01); *H04W 52/0219* (2013.01)

(56) References Cited

OTHER PUBLICATIONS

3GPP TR 23.887 V12.0.0 (Dec. 2013), 3rd Generation Partnership Project; Technical Specification Group Services and System Aspects; Study on Machine-Type Communications (MTC) and Other Mobile Data Applications Communications Enhancements (Release 12), Dec. 20, 2013 consisting of 151-pages.
SA WG2 Meeting #101, S2-140148, Taipei, Taiwan, Change Request—23.060, CR 1835, rev 1, Current Version: 12.3.0, Title: "Power Saving Mode Applicability", Source to WG: Ericsson, Source to TSG: S2, Work Item Code: MTCe_UEPCOP, Jan. 20-24, 2014 consisting of 2-pages.
3GPP TS 23.682 V12.1.0 (Mar. 2014) 3rd Generation Partnership Project; Technical Specification Group Services and System Aspects; Architecture Enhancements to Facilitate Communications with Packet Data Networks and Applications (Release 12) Mar. 10, 2014 consisting of 32-pages.
International Search Report and Written Opinion dated Feb. 4, 2015 for International Application No. PCT/EP2014/061610, International Filing Date: Jun. 4, 2014 consisting of 11-pages.

* cited by examiner

TERMINATING SERVICE RESTRICTION FOR USER EQUIPMENTS HAVING POWER SAVING MODE

CROSS-REFERENCE TO RELATED APPLICATIONS

This Application is a Submission Under 35 U.S.C. § 371 for U.S. National Stage Patent Application of International Application No. PCT/EP2014/061610, filed Jun. 4, 2014 entitled "TERMINATING SERVICE RESTRICTION FOR USER EQUIPMENTS HAVING POWER SAVING MODE," the entirety of which is incorporated herein by reference.

TECHNICAL FIELD

The invention relates to nodes and methods for operating nodes in a telecommunications network. More specifically, the invention relates to nodes and methods for operating nodes in a telecommunications network for serving one or more user equipments capable of entering a power saving mode (PSM).

BACKGROUND

Certain user equipments (UE) for use in telecommunications networks have requirements for low power consumption. Such UEs are typically not permanently attached to the network (as normally done by other devices such as, for example, mobile phone devices), as attachment to the network increases power consumption by the device.

An example of a device having low power consumption requirements is a Machine-Type-Communication (MTC) device. In short, MTC devices are a kind of UE/terminal arranged to communicate autonomously (i.e. without user intervention) over a telecommunications network with one or more servers (e.g. Application Servers (AS)) arranged to process, directly or indirectly, communications from/to the MTC devices. The 3GPP TS 23.682 discloses in chapter 4.2 the architecture reference model for a MTC device interfacing with a telecommunications network.

The telecommunications network through which the MTC device communicates can comprise either or both of a Packet Switch (PS) domain and a Circuit Switch (CS) domain. Each of the PS and CS domains comprises specialized servers. In the PS domain, the servers may include Serving General Packet Radio Service (GPRS) Support Nodes (SGSN) and Mobility Management Entities (MME). In the CS domain, the servers may include Mobile Switching Centers (MSC) and Visitors Location Register (VLR). In addition, servers may be common to both the PS and CS domains such as a Home Subscriber Server (HSS). 3GPP TS 23.682 specifies in chapter 4.5.4 a mechanism to optimize network signaling for UEs requiring lower power consumption and that expect infrequent mobile originating and terminating services and that can accept a corresponding latency in mobile terminating communication. This mechanism is implemented by using a new UE mode called Power Saving Mode (PSM). A UE using PSM is available for terminating services only for the period of time referred to as Active Time. The Active Time is a period of time specified after a mobile originated event like data transfer or signaling. Outside of the Active Time, the UE is not reachable for terminating communications till its next Active Time.

When a UE wants to use PSM it specifies an Active Time value during all its registrations (either: initial or re-registrations). Namely the UE inserts an Active Time information element on different registration procedures; such as: Attach, Tracking Area Update (TAU) and/or Routing Area Update (RAU) procedures from the UE to the corresponding serving node (e.g. SGSN/MME—SGSN for 2G/3G and MME for Long Term Evolution (LTE)). If the network supports PSM and accepts that the UE uses PSM, the network confirms usage of PSM by allocating an Active Time value to the UE.

If the network has allocated an Active Time value, the Mobile Station (MS) starts an Active Timer and the SGSN starts a Mobile Reachable timer with the value of Active Time. When the Active timer expires, the UE deactivates Access Stratum functions and enters PSM for the UE. In PSM, due to deactivation of Access Stratum functions, the UE stops all idle mode procedures, but continues to run any Non Access Stratum (NAS) timers that may apply, e.g. periodic RAU timer.

When the mobile reachable timer expires, the SGSN/MME knows that the UE has entered PSM and is not available for paging so it stops sending paging messages to the UE. This means that terminating services stop at SGSN/MME which rejects them and does not even attempt to page the UE. For the case of Short Messaging Service (SMS), as the UE is not paged, the SGSN/MME rejects the SMS but the SMS Service Centre (SC) can store it till the UE enters the Active Time again. For the case of IMS services the SGSN/MME rejects the communication so the service is lost.

PSM has no support in the CS domain on the network side. 3GPP TS 23.682 states that PSM should only be used by UEs using the PS domain, SMS and mobile originated IMS or CS services. A UE that uses mobile terminated IMS or CS services other than SMS should not use PSM as neither IMS nor the CS domain provide support for mobile terminated CS voice or IMS services to UEs that are in PSM.

3GPP TS 23.887 in chapter 7.1.3.3.1 describes a mechanism where a Service Capability Server (SCS) or other entity may decide to subscribe in an HSS to receive notification when a particular MTC device becomes reachable, e.g. when an Active Time starts. If the terminating CS or IMS service fails because the device was in PSM, the SCS should not retry the service but wait till it receives the notification of reachability from HSS.

Currently PSM is only supported by nodes of the PS domain, e.g. the MME and/or SGSN, but not by nodes of the CS domain or IMS network. For example, 3GPP TS 23.682 in chapter 4.5.4 recommends that a UE that uses terminating IMS services or CS terminating services other than SMS should not use PSM.

In the case of terminating IMS services, as the network does not support PSM and the HSS is not aware of the PSM status of a UE, the IMS service request will reach the serving node (SGSN/MME). If the UE is in PSM the SGSN/MME does not page the UE as the UE is not reachable and the service request is rejected. IMS/HSS resources have been wasted.

In the case of Terminating CS services, as the MSC/VLR does not support PSM functionality, the terminating service request is handled and the UE will be paged even when it is in PSM mode so HSS, MSC/VLR and radio resources are wasted.

The solution mentioned above where the SCS registers in the HSS for notifications of when a UE, such as an MTC, becomes reachable, would not prevent the SCS, or other applications, from sending terminating traffic at any time without waiting for the HSS notification and thereby wasting network resources.

SUMMARY

UEs in PSM can receive terminating CS or IMS services when attaching/connecting in a normal way, for example when attaching without specifying an Active Period. Under those conditions, external applications and/or other UEs can send terminating IMS or CS service requests to the UE. The inventors have appreciated that such external applications and/or UEs are typically not aware of the mode the receiving UE is using and, even if they are, they might still ask for such terminating CS or IMS services while the receiving UE is in PSM.

Further, the inventors have appreciated that in the case of terminating CS services, as CS domain nodes, such as the MSC and/or VLR, do not support PSM functionality, the UE will be paged and, subsequently, radio resources will be wasted. Taking into account that many types of UE, such as MTC devices, are in PSM most of the time, there is a high probability that terminating CS (or IMS) services will fail, which results in waste of resources such as unnecessary paging radio and network node processing. This is especially true if a SCS or an application for any reason retries to perform the terminating service several times.

Aspects and embodiments of the invention mitigate or solve one or more problems with the prior art, such as those discussed above.

According to the invention in a first aspect, there is provided a node of a telecommunications network for use as a Home Location Register and/or a Home Subscriber Server, the telecommunications network for serving one or more user equipments capable of entering a power saving mode. The network node comprises means for receiving, which may be a receiver, configured to receive power saving mode status data relating to a user equipment. The network node comprises means for determining a status flag, which may be a status flag determiner configured to set a status flag based on the received power saving mode status data and to store the status flag in a memory. The network node comprises means for controlling access to the user equipment, which may be an access controller, configured to control access to the user equipment by a terminating service originating in a Circuit Switched domain and/or an Internet Protocol Multimedia Subsystem domain of the telecommunications network, wherein access is controlled based on the stored status flag.

Optionally, the access controller is configured to deny access by the terminating service to the user if the stored status flag indicates that the user equipment is in power saving mode.

Optionally, the access controller is configured to allow access to the user equipment by a Short Messaging Service terminating service irrespective of the stored status flag.

Optionally, the receiver is configured to receive the power saving mode status data following a change in the power saving mode status of the user equipment.

Optionally, the node further comprising means for sending a subscription message, which may be an update subscriber, configured to send a subscription message to a further node in the telecommunications network for use as a Serving General Packet Radio Service Support Node and/or a Mobile Management Entity, wherein the subscription message is for subscribing the node to receive power saving mode status updates for one or more user equipments.

Optionally, the update subscriber is further configured to store in the memory power saving mode data relating to the one or more user equipments.

Optionally, the access controller is configured to control access by the terminating service to the user equipment in response to receiving a request from a gateway of the telecommunications network, such as a Gateway Mobile Switching Centre and/or Interrogating Call Session Control Function, for obtaining data relating to a server of the telecommunications network, such as a Mobile Switching Centre/Visitor Location Register and/or a Serving Call Session Control Function, assigned to the user equipment.

According to the invention in a second aspect, there is provided a method for operating a node of a telecommunications network, the node for use as a Home Location Register and/or a Home Subscriber Server, the telecommunications network for serving one or more user equipments capable of entering a power saving mode. The method comprises receiving, by a receiver (204), power saving mode status data relating to a user equipment. The method comprises setting, by a status flag determiner (214), a status flag based on the received power saving mode status data and storing the status flag in a memory. The method comprises controlling, by an access controller, access to the user equipment by a terminating service originating in a Circuit Switched domain and/or an Internet Protocol Multimedia Subsystem domain of the telecommunications network, wherein access is controlled based on the stored status flag.

Optionally, the method further comprises denying, by the access controller, access by the terminating service to the user if the stored status flag indicates that the user equipment is in power saving mode.

Optionally, the method further comprises allowing, by the access controller, access to the user equipment by a Short Messaging Service terminating service irrespective of the stored status flag.

Optionally, the method further comprises receiving, by the receiver, the power saving mode status data following a change in the power saving mode status of the user equipment.

Optionally, the method further comprises sending, by an update subscriber, a subscription message to a further node in the telecommunications network for use as a Serving General Packet Radio Service Support Node and/or a Mobile Management Entity, wherein the subscription message is for subscribing the node to receive power saving mode status updates for one or more user equipments.

Optionally, the method further comprises storing, by the update subscriber, power saving mode data relating to the one or more user equipments in the memory.

Optionally, the method further comprises controlling, by the access controller, access by the terminating service to the user equipment in response to receiving a request from a gateway such as a Gateway Mobile Switching Centre and/or Interrogating Call Session Control Function, of the telecommunications network for obtaining data relating to a server of the telecommunications network, such as a Mobile Switching Centre/Visitor Location Register and/or a Serving Call Session Control Function, assigned to the user equipment.

According to the invention in a third aspect, there is provided a computer program comprising instructions which, when executed on at least one processor, cause the at least one processor to carry out the method specified above.

According to the invention in a fourth aspect, there is provided a carrier containing the computer program mentioned above, wherein the carrier is one of an electronic signal, optical signal, radio signal, or non-transitory computer readable storage medium.

According to the invention in a fifth aspect, there is provided a node of a telecommunications network for use as a Serving General Packet Radio Service Support Node and/or a Mobile Management Entity, the telecommunications network for serving one or more user equipments capable of entering a power saving mode. The node comprises a receiving means, which may be a receiver, configured to receive an registration message from a user equipment, the registration message comprising data relating to a power saving mode of the user equipment. The node comprises means for determining a power saving mode status, which may be a power saving mode status determiner, configured to determine the power saving mode status of the user equipment based on the received registration message. The node comprises means for transmitting, which may be a transmitter, configured to transmit data relating to the determined power saving mode status of the user equipment to a further node for use as a Home Location Register and/or a Home Subscriber Server of the telecommunications network.

As used herein, the term registration message encompasses at least one or more of an initial attach message, a TAU and a RAU.

Optionally, the power saving mode status determiner is configured to determine that the user equipment is in power saving mode status if the registration message comprises data relating to an Active Time, and to determine that the user equipment is not in power saving mode status if the registration message does not comprise data relating to an Active Time.

Optionally, the node further comprising a means for updating a power saving mode status, which may be a power saving mode updater, configured to determine whether the power saving mode of the user equipment has changed based on the received registration message.

Optionally, the power saving mode updater is configured to control the transmitter to transmit the data relating to the determined power saving mode of the user equipment to the further node if the power saving mode of the user equipment has changed.

Optionally, the power saving mode updater is configured to determine whether the power saving mode of the user equipment has been updated based on whether the registration message comprises an Active Time.

Optionally, the power saving mode status determiner is configured to store the power saving mode status of the user equipment in the memory.

Optionally, the node further comprising a power saving mode handover controller configured to control the transmitter to transmit the power saving mode status of the user equipment to a further node for use as a Serving General Packet Radio Service Support Node and/or a Mobile Management Entity serving the user equipment.

Optionally, the power saving mode status determiner is configured to store the power saving mode status of the user equipment as part of the Mobility Management context.

Optionally, the receiver configured to receive a subscription message from a further node for use as a Home Location Register and/or a Home Subscriber Server, the subscription message for subscribing the further node to power saving mode status updates for one or more user equipments.

Optionally, the power saving mode status updater is configured to control the transmitter to transmit the data relating to the determined power saving mode of the user equipment to one or more further nodes from which a subscription message has been received.

According to the invention in a sixth aspect, there is provided a method for operating a node of a telecommunications network, the node for use as a Serving General Packet Radio Service Support Node and/or a Mobile Management Entity, the telecommunications network for serving one or more user equipments capable of entering a power saving mode. The method comprises receiving, by a receiver, an registration message from a user equipment, the registration message comprising data relating to a power saving mode of the user equipment. The method comprises determining, by a power saving mode status determiner, the power saving mode status of the user equipment based on the received registration message. The method comprises transmitting, by a transmitter, data relating to the determined power saving mode status of the user equipment to a further node for use as a Home Location Register and/or a Home Subscriber Server of the telecommunications network.

Optionally, the step of determining comprises determining that the user equipment is in power saving mode status if the registration message comprises data relating to an Active Time, and determining that the user equipment is not in power saving mode status if the registration message does not comprise data relating to an Active Time.

Optionally, the method further comprises determining, by a power saving mode updater (316), whether the power saving mode of the user equipment has changed based on the received registration message.

Optionally, the method further comprises controlling, by the power saving mode updater, the transmitter to transmit the data relating to the determined power saving mode of the user equipment to the further node if the power saving mode of the user equipment has changed.

Optionally, the method further comprises determining, by a power saving mode updater, whether the power saving mode of the user equipment has been updated based on whether the registration message comprises an Active Time.

Optionally, the power saving mode status determiner is configured to store the power saving mode status of the user equipment in the memory.

Optionally, the method further comprises controlling, by a power saving mode handover controller, the transmitter to transmit the power saving mode status of the user equipment to a further node for use as a Serving General Packet Radio Service Support Node and/or a Mobile Management Entity serving the user equipment.

Optionally, the method further comprises storing, by the power saving mode status determiner, the power saving mode status of the user equipment as part of the Mobility Management context.

Optionally, the method further comprises receiving, by the receiver, a subscription message from a further node for use as a Home Location Register and/or a Home Subscriber Server, the subscription message for subscribing the further node to power saving mode status updates for one or more user equipments.

Optionally, the method further comprises controlling, by the power saving mode status updater, the transmitter to transmit the data relating to the determined power saving mode of the user equipment to one or more further nodes from which a subscription message has been received.

According to the invention in a seventh aspect, there is provided a computer program comprising instructions which, when executed on at least one processor, cause the at least one processor to carry out the method discussed above.

According to the invention in an eighth aspect, there is provided a carrier containing the computer program discussed above, wherein the carrier is one of an electronic signal, optical signal, radio signal, or non-transitory computer readable storage medium.

BRIEF DESCRIPTION OF DRAWINGS

Exemplary embodiments of the invention are disclosed herein with reference to the accompanying drawings, in which.

DETAILED DESCRIPTION

Generally, disclosed herein are methods and apparatus for blocking terminating CS and IMS services in a UE, such as a MTC, that is in PSM.

Figure 1:
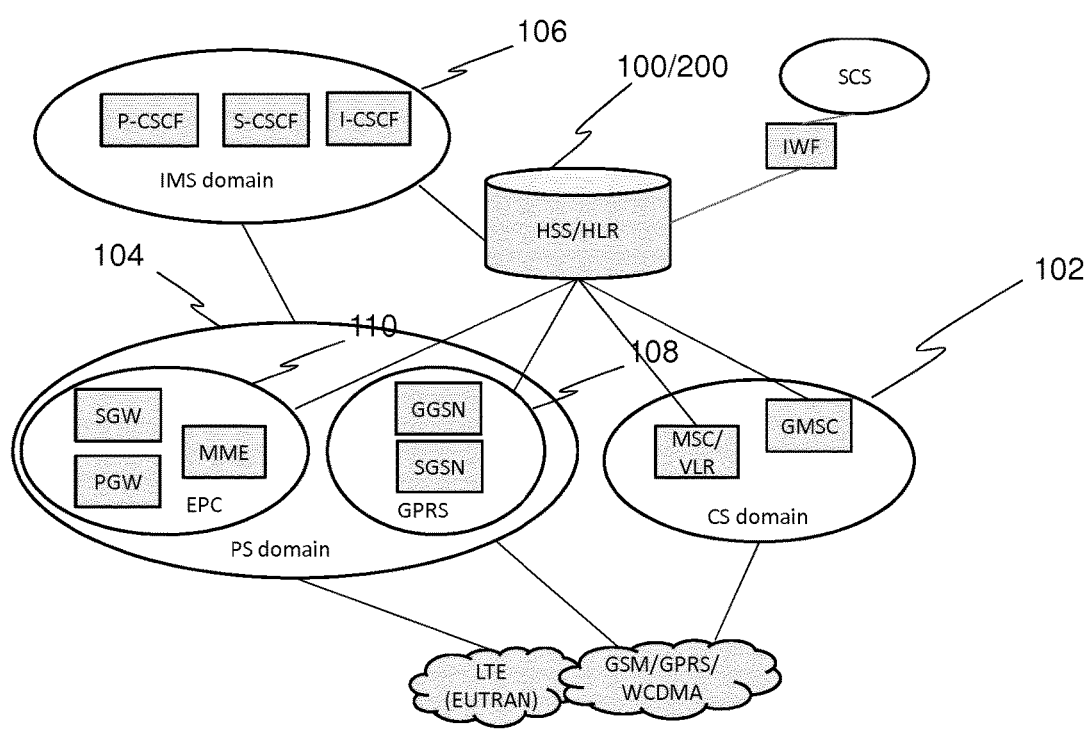
FIG. 1 is a block schematic diagram showing an architecture of a telecommunications network.

FIG. 1 shows a network architecture for a telecommunications network. An HSS/HLR 100 is in electrical communication with nodes in each of a CS domain 102, a PS domain 104 and an IMS subsystem 106. In particular, the HSS/HLR 100 is in electrical communication with an SGSN 108 and an MME 110 in the PS domain 104.

The inventors have appreciated that this is only currently possible for terminating packet-based services when the UE is attached to a PS domain of a telecommunications network and with the support of nodes belonging to the PS domain. However, if the UE attaches also to a CS domain of the telecommunications network, even outside an Active Time for the UE in PSM, nothing prevents the nodes of the CS domain from accepting messages related to terminating services for a currently attached UE and to attempt to connect to the UE for delivering the terminating service. These terminating services will ultimately fail since the UE has inhibited its radio communication resources in PSM thus resulting in a waste of network communication resources.

The methods and apparatus disclosed herein provide a solution that involves a modification in a server for use as an HLR and/or HSS of a telecommunication system. In addition, modifications in some nodes of the PS domain of the telecommunication system may be required.

In particular, the methods and apparatus disclosed stem from the principle that, for a terminating CS or IMS service, the HSS/HSS of the telecommunication system always receives a query for obtaining information to route an initial message of a terminating service to the UE/MTC concerned. The term UE is used for the remainder of this document but it is noted that a UE may be an MTC.

In methods and apparatus disclosed herein, the HSS determines an may store information relating to the corresponding PSM status of an UE and subsequently controls access to the UE by allowing or blocking a terminating CS or IMS service addressed to the UE. The PSM status information stored by the HSS in respect to an UE may be determined based on information provided by one or more nodes in the PS domain assigned to serve communications services to the UE. For example, information may be provided by an MME or SGSN.

An advantage provided by methods and apparatus disclosed is that, in order to accomplish power saving requirements of some UEs, legacy nodes of the CS domain, such as MSCs and/or VLRs, involved in the processing and routing of messages originating and terminating in the UE do not need to be modified. Instead, in methods and apparatus disclosed herein, terminating services may be blocked by a server for use as an HSS and/or HLR at a very early stage.

Methods and apparatus disclosed herein restrict certain communication services to PSM capable UEs when such UEs are using PSM. This service restriction helps to optimize resources when they are not needed for terminating services to the UE.

In particular methods and embodiments, CS domain terminating services traffic (other than terminating SMSs) and IMS terminating services for UEs are rejected in a server for use as an HSS/HLR when the UE is using PSM. Those terminating services are allowed access to the UE when it is not using PSM.

Methods and apparatus disclosed use notify an HSS/HLR when a UE starts using PSM functionality and when it stops using it. In exemplary methods and embodiments, the HSS/HLR is not notified every time the PSM is not used or every time the PSM is used, but when the use of the PSM is different from that indicated previously. That is, when the status of the PSM for a UE changes, for example, when the UE requests an Active Time when attaching to the network and in the previous attach request it did not, or vice versa.

Therefore, in methods and apparatus disclosed, a UE that saves power by applying PSM will not be reachable for IMS and CS terminating traffic. In particular methods and apparatus, SMS terminating services may still be permitted access to the UE. Further, in particular methods and apparatus, access to the UE by CS and IMS terminating services is denied even during the short periods of Active Time when the UE is reachable. This should be a reasonable limitation.

It is however preferable in certain circumstances to allow SMS messages to be delivered during these short periods of active time since SMS can be used among other things to carry Device Triggers to UEs. It is advantageous for device triggering to be operational also for UEs in PSM. Existing message waiting functions and activity notifications in the SGSN/MME, HLR/HSS and Short Message Service Centre (SMSC) may be used to support this functionality.

In exemplary methods and apparatus, the HSS shall maintain a PSM status for one or more UEs. Accordingly, there may be a PSM status flag having one of two values: "using PSM" and "not using PSM".

According to exemplary methods and apparatus, the PSM status flag in the HSS is set to "using PSM" if a registration message of the UE (either: initial or re-registration) comprise data relating to an "Active Time", and it is set as "not using PSM" otherwise. In this respect, and as disclosed further below, the HSS preferably is updated by the corresponding SGSN and/or MME about whether the UE included or not an "Active Time" information in a registration message.

When a UE wants to use PSM, typically, it requests an Active Time value during Attach and/or TAU/RAU procedures. In order to maintain the "PSM status" flag in the HSS, the SGSN/MME may notify the HSS every time the PSM behavior of the UE changes.

For example, when a UE that is sending an Active Time value in attach and TAU/RAU procedures stops doing so, the SGSN/MME notifies this change to the HSS. Similarly, when a UE that is not sending an Active Time value in attach and TAU/RAU procedures starts doing so, the SGSN/MME notifies this behavior change to HSS. Therefore, the SGSN/MME may need to maintain the PSM status either as part of its MM Context or separately. If the PSM status is maintained as part of the MM Context, it may be forwarded to any new SGSN/MME at SGSN/MME handover, when the UE fall under the control of the new SGSN/MME. If the status is maintained separately from the MM Context in the SGSN/MME, a new SGSN/MME after a SGSN/MME handover may indicate the PSM status to the HSS. This may then be a redundant indication, but the "PSM status" in the HSS would still be correct.

In addition, the SGSN/MME may notify the PSM status of a UE to the HSS at every attach request. In exemplary methods and apparatus, notification of PSM status of a UE is not sent every time the UE enters or leaves the PSM, which may be every TAU/RAU. Rather, the notification of PSM status may be sent only when the behavior is different from the preceding TAU/RAU and/or in an attach procedure. Optionally, the PSM status notification may be sent when a new SGSN/MME node is selected during handover.

In implementation, the PMS status notifications may be similar to "IMEI change" notifications.

The MSC/VLR does not support PSM procedures and no procedures are standardized in 3GPP for CS so it may not be able to implement PSM status change notifications.

When a terminating CS or IMS service sends a Send Routing Information message or a Location Information Request message, it is received by the HSS, which checks the PSM status flag. If the PSM status flag is set indicating that the UE is using the PSM, the terminating IMS or CS service will be rejected by the HSS. SMS is sent typically through the PS domain. If that is not possible or it fails it is normally sent through CS. In such circumstances, the HSS may be configured to allow an SMS message to access the UE irrespective of the PSM status flag.

In exemplary methods and apparatus, PSM status flag maintenance and associated terminating services restriction can be performed for all UEs. In alternate exemplary methods and apparatus, maintenance of the PSM status flag may be based on a new kind of subscription data setting in the HSS that indicates that UE has limited terminating IMS and CS services due to the UE having PSM capability. That is, terminating IMS and CS services other than SMS are not allowed access to the UE when the UE is using PSM.

If the PSM status is maintained in the HSS only for UEs for which the HSS has subscribed to PSM status information on, the HSS has to register in the SGSN/MME to receive the corresponding PSM status change notifications for those UEs. For example, registration for receiving information can be in the form of a subscription message sent from the HSS to SGSN/MME, which may be an "Insert subscriber data" procedure (i.e. a MAP message) for such UEs.

The SGSN/MME may inform the HSS if it supports PSM status change notifications.

IMS systems may cover the case of stopping a terminating call, but in the SGSN/MME, and not earlier (i.e. within the IMS, as suggested by this invention). So, paging resources are not wasted (as in the CS services case). However, in methods and apparatus disclosed herein, a terminating IMS call is stopped before, in the HSS. That is, it is stopped by the HSS of the IMS when said HSS is queried from a node in the IMS (such as from an I-CSCF), and well before the signaling of the service would get (i.e. in case it was allowed by the HSS of the IMS) to the SGSN/MME assigned to the target UE.

Figure 2:
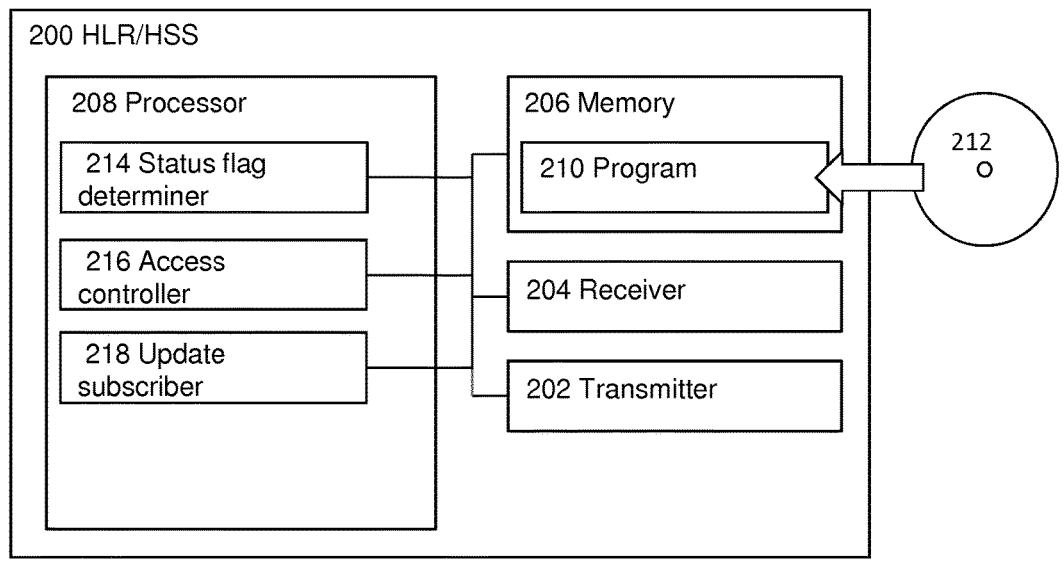
FIG. 2 is a block schematic diagram showing a server for use as an HSS and/or an HLR.

FIG. 2 shows a schematic diagram of a server 200 for use as an HSS and/or an HLR in a telecommunications network. The server 200 may be an HSS.

The server 200 comprises a transmitter 202 and a receiver 204. The transmitter 202 and receiver 204 are in electrical communication with other communication units, UEs, servers and/or functions in a telecommunications network and are configured to transmit and receive data accordingly.

It is noted that the term "electrical communication" encompasses both wired and wireless electrical communication. Therefore, electrical communication may be, for example, a network communication over a wired connection or a network communication of over a radio frequency connection.

The server 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake at least the functions of a status flag determiner 214, an access controller 216 and an update subscriber 218, as set out herein.

Each of the transmitter 202 and receiver 204, memory 206, processor 208, status flag determiner 214, access controller 216 and update subscriber 218 is in electrical communication with the other features of the server 200. The server 200 can be implemented as a combination of computer hardware and software. In particular, the status flag determiner 214, access controller 216 and update subscriber 218 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the status flag determiner 214, access controller 216 and update subscriber 218, but are not limited to such.

Figure 3:
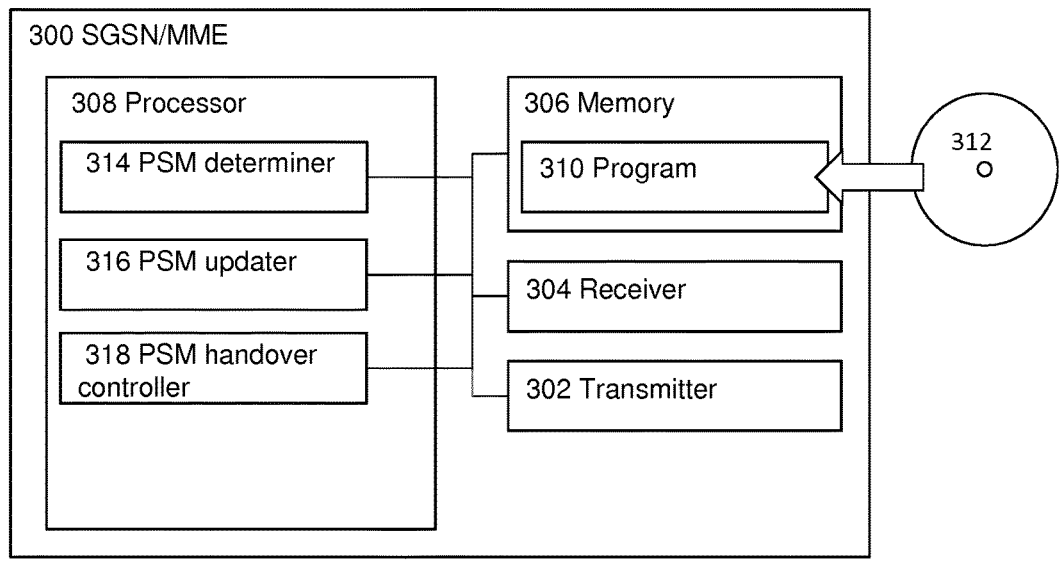
FIG. 3 is a block schematic diagram showing a server for use as an SGSN and/or an MME.

FIG. 3 shows a schematic diagram of a server 300 for use as a SGSN and/or a MME in a telecommunications network. The server 300 may be a SGSN and/or a MME.

The server 300 comprises a transmitter 302 and a receiver 304. The transmitter 302 and receiver 304 are in electrical communication with other communication units, UEs, servers and/or functions in a telecommunications network and are configured to transmit and receive data accordingly.

The server 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a PSM determiner 314, a PSM updater 316 and a PSM handover controller 318, as set out below.

Each of the transmitter 302 and receiver 304, memory 306, processor 308 and data converter 314 is in electrical communication with the other features of the server 300. The server 300 can be implemented as a combination of computer hardware and software. In particular, the profile determiner 314 and the required services determiner 316 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the PSM determiner 314, the PSM updater 316 and the PSM handover controller 318, but are not limited to such.

Figure 4:
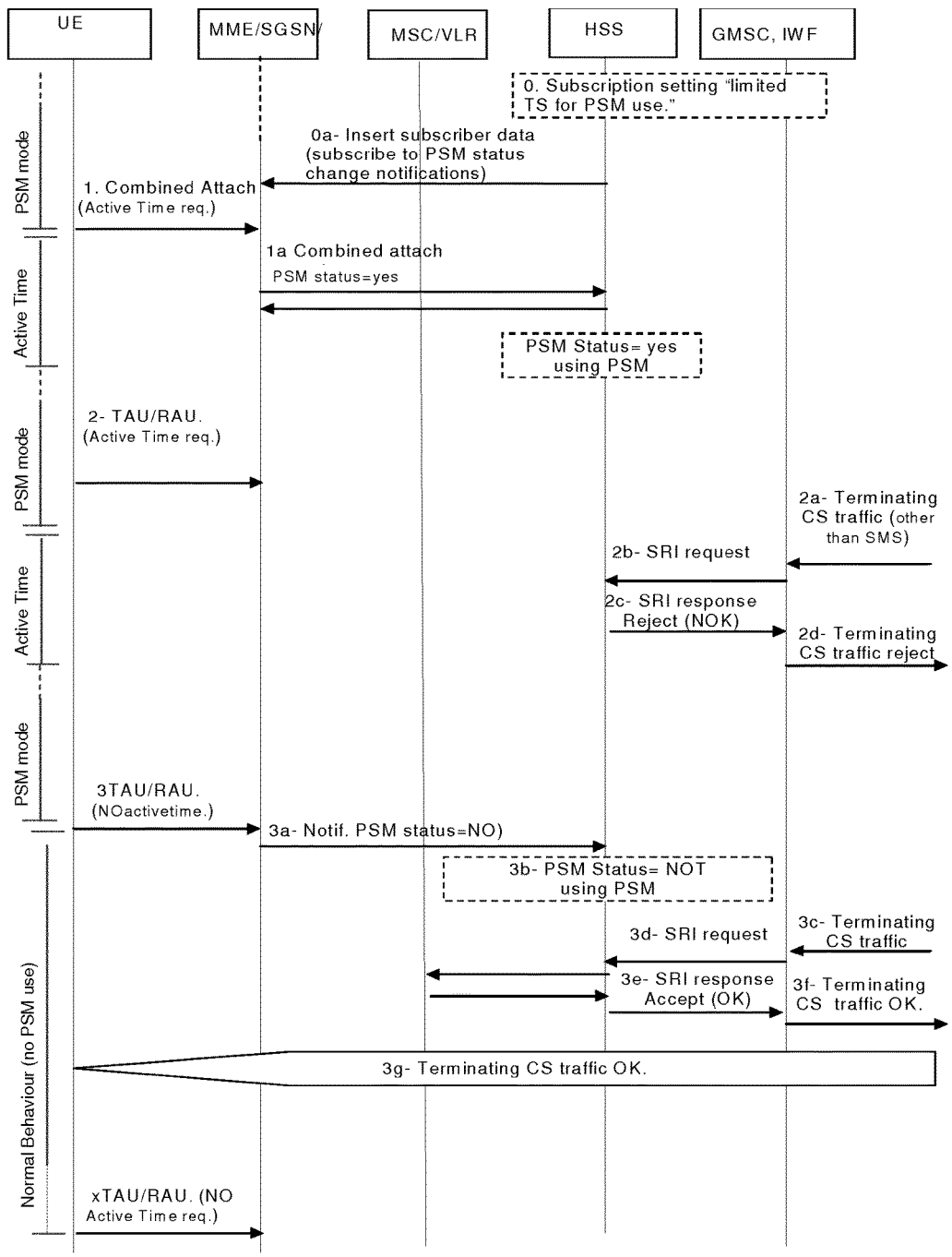
FIG. 4 is a signalling diagram illustrating control of terminating CS services other than SMS by the HSS for UEs capable of using PSM.

FIG. 4 shows a signaling diagram and illustrates the control of terminating CS services other than SMS by the HSS for UEs capable of using PSM.

(0) The HSS 100 is configured to limit terminating services for PSM in relation to a particular UE. This indicates that terminating IMS and CS services other than SMS are not allowed access to the UE when it is using PSM.

(a) If the UE is already registered in the HSS 100 via a SGSN 108 and/or MME 110 then, after the HSS 100 is configured to limit terminating services, the update subscriber 218 transmits a subscription message to the SGSN 108 and/or MME 110 for PSM status change notifications. This may be using, for example, an Insert Subscriber Data message. If the UE is not registered in the HSS 100 then the update subscriber 218 will send the subscription message to the SGSN 108 or the MME in a subsequent attach request.

(1) The user equipment sends an attach request to CS domain nodes (MSC/VLR) and PS domain nodes (SGSN 108 and/or MME 110). The user equipment wants to use PSM so the attach request contains an Active Time.

(a) The SGSN 108 and/or MME 110 sends a Location Updating procedure (as part of an attachment procedure) indicating to the HSS 100 that the UE is using PSM. The status flag determiner 214 sets the PSM status flag accordingly. The SGSN 108 and/or MME 110 agree the Active Time indicator with the UE and the UE begins the Active Time, during which it is available to terminating services.

(2) The UE sends a periodic TAU/RAU message to the SGSN 108 and/or the MME 110. The TAU/RAU message includes a further Active Time indicating that the UE still requires use of PSM. In this case, the PSM determiner 314 determines that the UE is in PSM. However, the PSM updater 316 does send a notification to the HSS 100, as the PSM status of the UE has not changed.

(a) A CS domain terminating service request is received at a corresponding gateway.

(b) The gateway sends a MAP Send Routing Information (SRI) message to the HSS 100 to obtain information identifying the server assigned to serve signalling to and from the UE.

(c) The access controller 218 checks the PSM status flag and rejects the request because the PSM status flag indicates that the UE is using PSM. In this way, access to the UE by the CS domain terminating service is denied.

(d) The gateway rejects CS domain terminating service request.

(3) The UE sends a further periodic TAU/RAU message to the SGSN 108 and/or the MME 110. The TAU/RAU message includes no Active Time, indicating that the UE no longer requires use of PSM. The PSM determiner 316 determines that the UE is not using PSM.

(a) The PSM updater 318 sends a notification to the HSS 100 to update the PSM status flag for the UE, as the PSM status of the UE has changed.

(b) The status flag determiner 214 sets the PSM Status flag to indicate that the UE is not using PSM and stores the flag in the memory 206.

(c) A CS domain terminating service request is received at the corresponding gateway (d) The gateway sends the MAP Send Routing Information (SRI) message to the HSS 100.

(e) The access controller 216 checks the PSM status flag and processes the terminating service request normally because the status flag indicates that the UE is not using PSM.

(f) The gateway continues with the CS domain terminating service request normally.

(g) CS domain terminating service has access to the UE.

Figure 5:
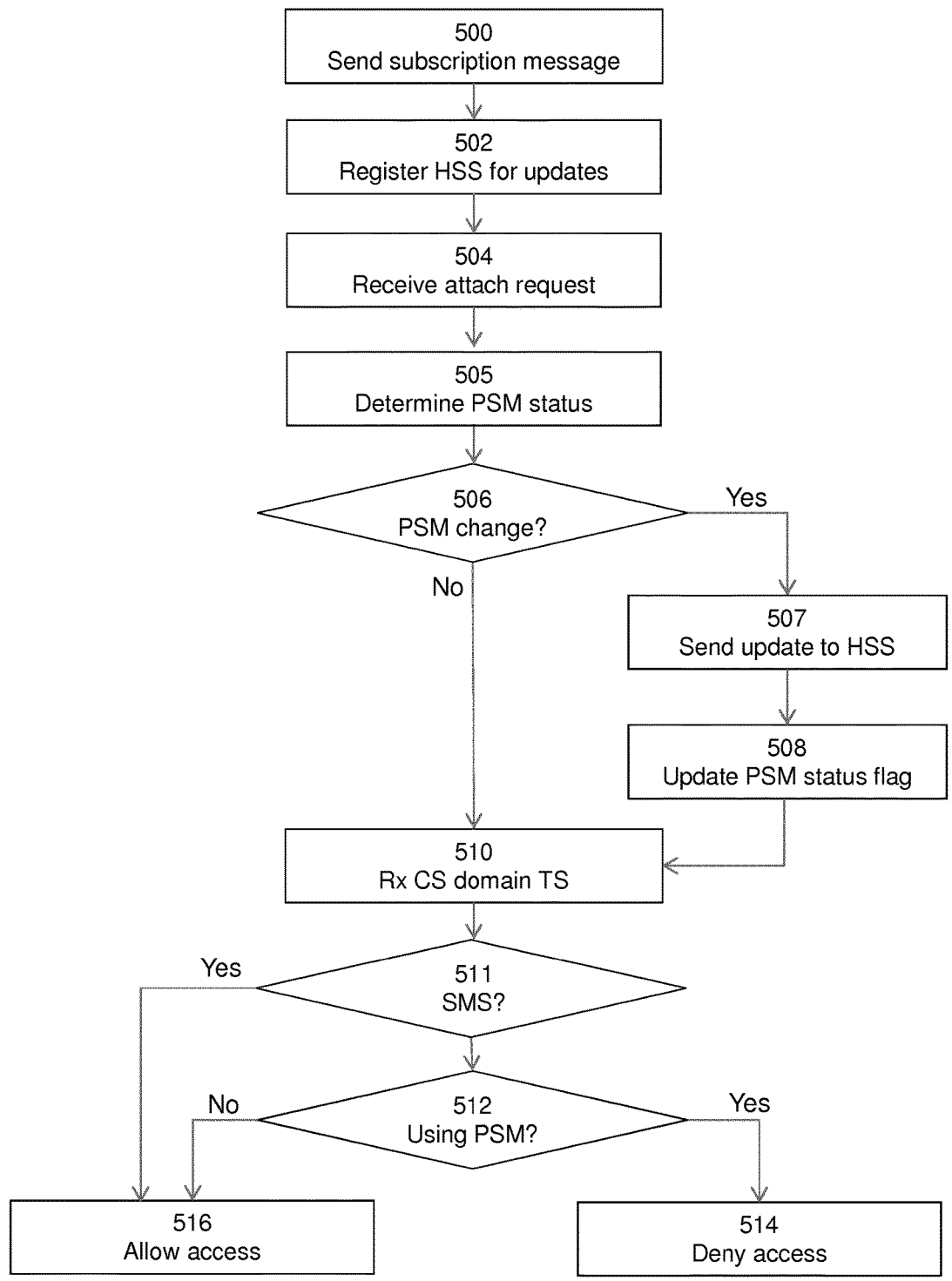
FIG. 5 is a flow diagram for a method of controlling access of a CS domain terminating service to a UE capable of using PSM.

FIG. 5 shows a flow diagram for a method of controlling access of a CS domain terminating service to a UE capable of using PSM. The update subscriber 218 optionally sends 500 a subscription message to the SGSN 108 and/or the MME 110. The PSM updater 316 registers 502 the HSS 100 to receive updates on the PSM status of the UE.

The SGSN 108 and/or the MME 110 receives 504 an attach request from the UE. The attach request includes information indicating the PSM status of the UE. For example, the attach request may include an Active Time, which indicates that the UE is using PSM, or may include no Active Time, which indicates that the UE is not using PSM. The PSM determiner 314 determines 505 the PSM status of the UE based on the received information relating to the PSM status of the UE and, if the PSM status has changed 506, controls the transmitter 302 to send 507 a notification to the HSS 100.

The HSS 100 receives the notification and the status flag determiner 214 updates 508 the PSM status flag, which may then be stored in the memory 206. If the PSM status has not changed 504, no notification is transmitted to the HSS 100 and the PSM status flag is not updated.

A gateway receives 510 a CS domain terminating service request and requests information on the server serving the UE from the HSS 100. The access controller 218 determines 511 whether the terminating service is an SMS terminating service. If the terminating service is an SMS service, the access controller 218 allows 516 access to the UE. If the terminating service is not an SMS service, the access controller 218 checks the PSM status flag and controls access to the UE by the terminating service based on the PSM status flag. If the status flag indicates that the UE is using PSM, access to the UE by the CS domain terminating service is denied 514. If the status flag indicates that the UE is not using PSM, access to the UE by the CS domain terminating service is allowed 516.

Figure 6:
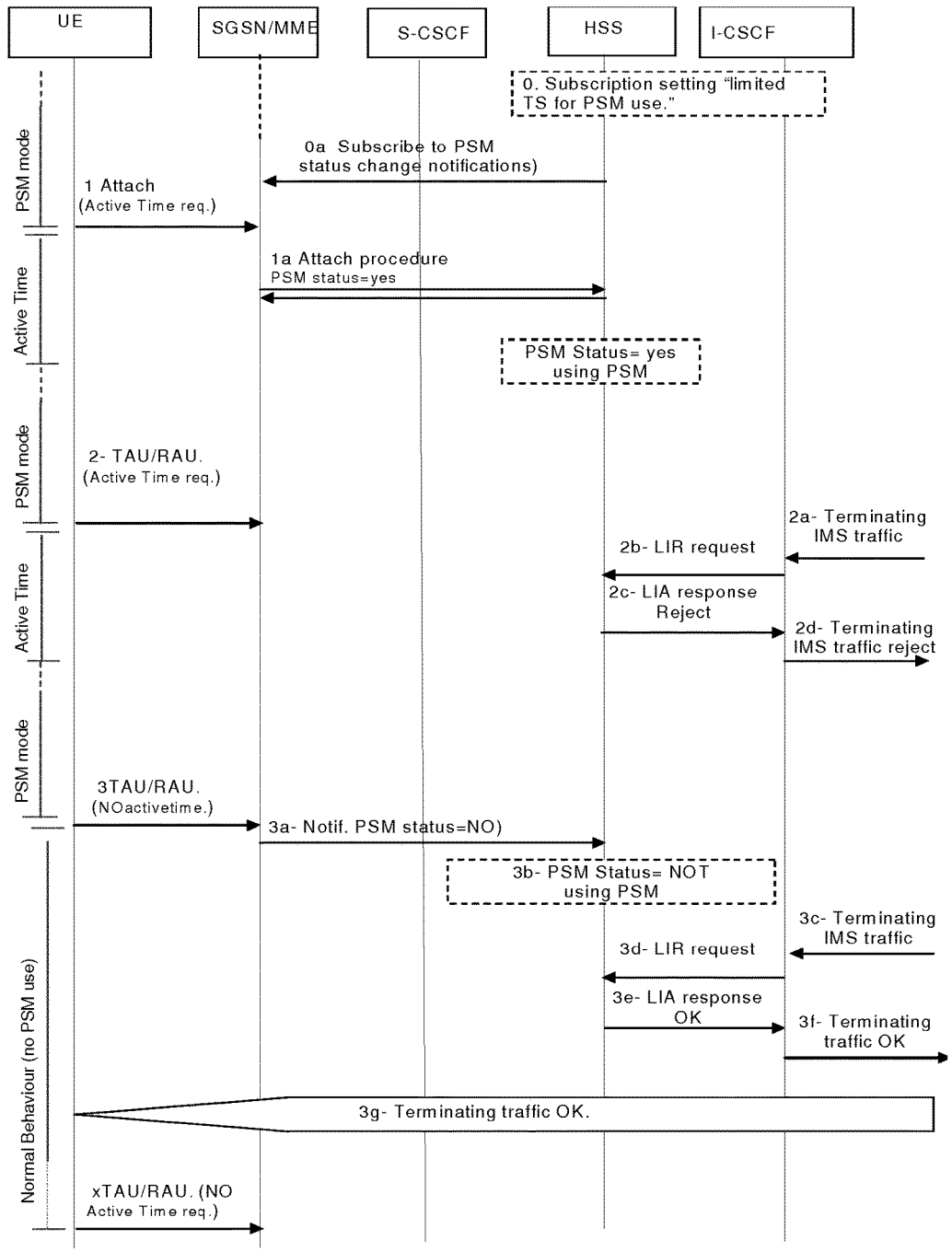
FIG. 6 is a signaling diagram and illustrates the control of terminating IMS services other than SMS by the HSS for UEs capable of using PSM.

FIG. 6 shows a signaling diagram and illustrates the control of terminating IMS services other than SMS by the HSS for UEs capable of using PSM.

(0) The HSS 100 is configured to limit terminating services for PSM in relation to a particular UE. This indicates that terminating IMS and CS services other than SMS are not allowed access to the UE when it is using PSM.

(a) If the UE is already registered in the HSS 100 via a SGSN 108 and/or MME 110 then, after the HSS 100 is configured to limit terminating services, the update subscriber 218 transmits a subscription message to the SGSN 108 and/or MME 110 for PSM status change notifications. This may be using, for example, an Insert Subscriber Data message. If the UE is not registered in the HSS 100 then the update subscriber 218 will send the subscription message to the SGSN 108 or the MME in a subsequent attach request.

(1) The user equipment sends an attach request to PS domain nodes (SGSN 108 or MME 110). The user equipment wants to use PSM so the attach request contains an Active Time.

(a) The SGSN 108 and/or MME 110 sends a Location Updating procedure (as part of an attachment procedure) indicating to the HSS 100 that the UE is using PSM. The status flag determiner 214 sets the PSM status flag accordingly. The SGSN 108 and/or MME 110 agree the Active Time indicator with the UE and the UE begins the Active Time, during which it is available to terminating services.

(2) The UE sends a periodic TAU/RAU message to the SGSN 108 and/or the MME 110. The TAU/RAU message includes a further Active Time indicating that the UE still requires use of PSM. In this case, the PSM determiner 314 determines that the UE is in PSM. However, the PSM updater 316 does send a notification to the HSS 100, as the PSM status of the UE has not changed.

(a) A terminating IMS service request (Invite message) is received at the corresponding gateway (I-CSCF).

(b) The I-CSCF sends a DIAMETER protocol Location-Info-Request (LIR) message to the HSS 100 to obtain information identifying the S-CSCF assigned to the UE.

(c) The access controller 218 checks the PSM status flag and rejects the request because the PSM status flag indicates that the UE is using PSM. In this way, access to the UE by the IMS terminating service is denied.

(d) The terminating IMS service is rejected by the I-CSCF (3) The UE sends a further periodic TAU/RAU message to the SGSN 108 and/or the MME 110. The TAU/RAU message includes no Active Time, indicating that the UE no longer requires use of PSM. The PSM determiner 316 determines that the UE is not using PSM.

(a) The PSM updater 318 sends a notification to the HSS 100 to update the PSM status flag for the UE, as the PSM status of the UE has changed.

(b) The status flag determiner 214 sets the PSM Status flag to indicate that the UE is not using PSM and stores the flag in the memory 206.

(c) A terminating IMS service request is received at the I-CSCF.

(d) The I-CSCF sends a Location-Info-Request (LIR) to the HSS 100.

(e) The access controller 216 checks the PSM status flag and processes the terminating service request normally because the status flag indicates that the UE is not using PSM.

(f) The I-CSCF continues with the IMS terminating service request normally.

(g) The IMS terminating service has access to the UE.

Figure 7:
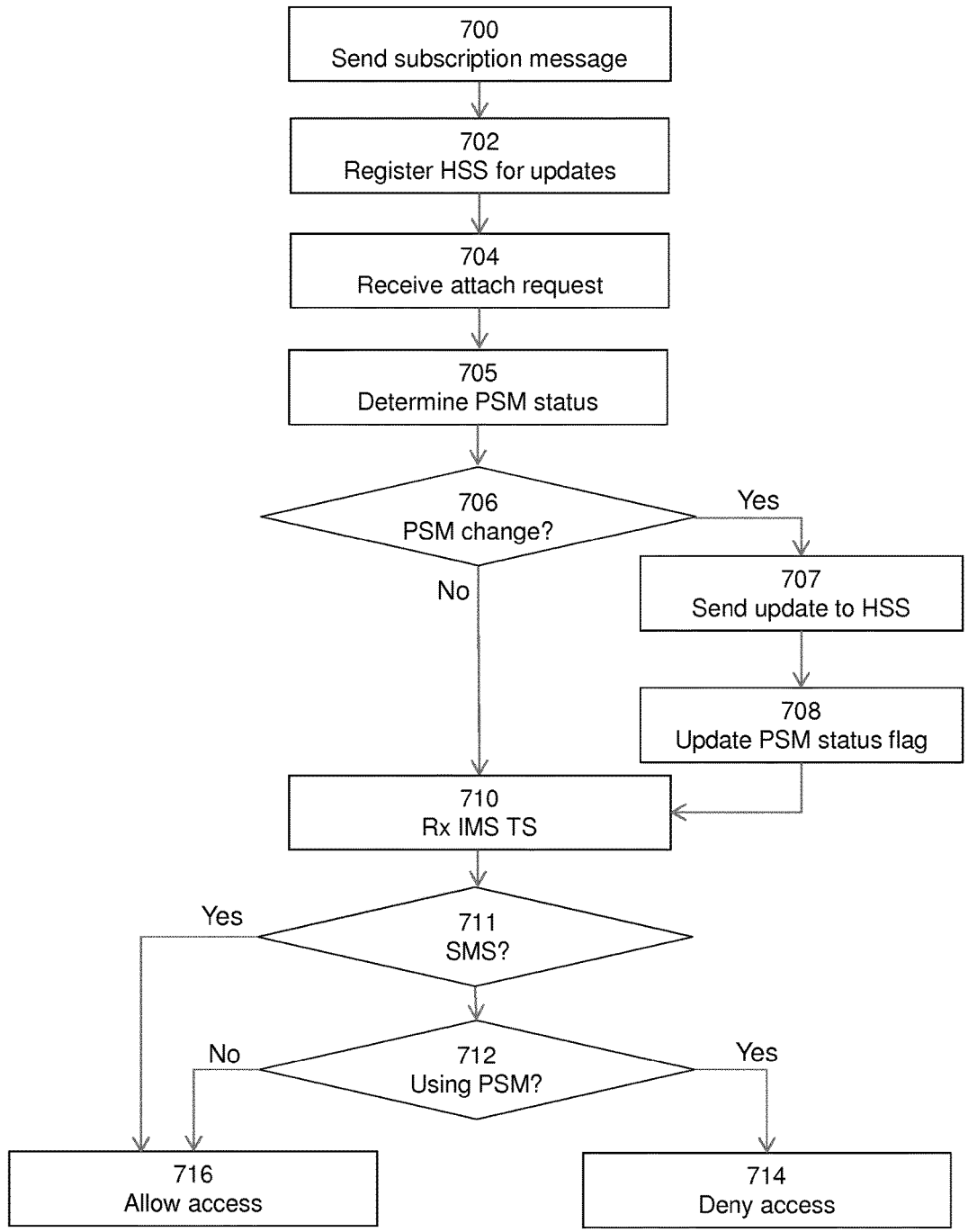
FIG. 7 is a flow diagram for a method of controlling access of an IMS terminating service to a UE capable of using PSM.

FIG. 7 shows a flow diagram for a method of controlling access of an IMS terminating service to a UE capable of using PSM. The update subscriber 218 optionally sends 700 a subscription message to the SGSN 108 and/or the MME 110. The PSM updater 316 registers 702 the HSS 100 to receive updates on the PSM status of the UE.

The SGSN 108 and/or the MME 110 receives 704 an attach request from the UE. The attach request includes information indicating the PSM status of the UE. For example, the attach request may include an Active Time, which indicates that the UE is using PSM, or may include no Active Time, which indicates that the UE is not using PSM. The PSM determiner 314 determines 705 the PSM status of the UE based on the received information relating to the PSM status of the UE and, if the PSM status has changed 706, controls the transmitter 302 to send 707 a notification to the HSS 100.

The HSS 100 receives the notification and the status flag determiner 214 updates 708 the PSM status flag, which may then be stored in the memory 206. If the PSM status has not changed 704, no notification is transmitted to the HSS 100 and the PSM status flag is not updated.

An I-CSCF receives 710 an IMS terminating service request and requests information on the server serving the UE from the HSS 100. The access controller 218 determines 711 whether the terminating service is an SMS terminating service. If the terminating service is an SMS service, the access controller 218 allows 716 access to the UE. If the terminating service is not an SMS service, the access controller 218 checks 712 the PSM status flag and controls access to the UE by the terminating service based on the PSM status flag. If the status flag indicates that the UE is using PSM, access to the UE by the CS domain terminating service is denied 714. If the status flag indicates that the UE is not using PSM, access to the UE by the CS domain terminating service is allowed 716.

In the context of the methods and apparatus disclosed, the interfaces between the MME 110 and the HSS 100 and between the SGSN 108 and the HSS 100 may be impacted. These interfaces can be based on either diameter or MAP protocol. The interfaces that may be modified include:

S6a: diameter interface between HSS 100 and MME 110

S6d: diameter interface between HSS 100 and SGSN 108

Gr: MAP interface between HSS 100 and SGSN 108 (or HSS 100 and MME 110 if an Interworking function is used)

The Gr Interface

Location Updating Procedure

In the Location Updating procedure the SGSN 108 informs to the HSS 100 about the current PSM status of the UE by MAP_UpdateGPRS-Location message:

A new parameter, PSM status, may be defined with two possible values "Using PSM" and "Not using PSM"

Notification Procedure

The Notification procedure where the HSS 100 is notified about a PSM status change by the SGSN 108 or MME 110 can be mapped to an UpdateGPRS-Location message with the same parameter:

A new parameter, PSM status, may be defined with two possible values "Using PSM" and "Not using PSM"

In this case, the HSS 100 may skip subscriber data downloading and any mobility management functionality.

Subscription to Notifications

As explained above, if the PSM status is maintained in HSS 100 only for UEs subscribed to it, the HSS 100 has to send a subscription message to register in the SGSN 108 to receive corresponding PSM status change notifications for those UEs. For this purpose, the HSS 100 may use the existing MAP_Insert Subscriber Data message. It can be used both as part of the Location Updating procedure, or once the UE is located, to inform the SGSN 108 or MME 110 about a subscription change.

A new parameter, Subscribe to PSM status notifications, may be defined for the purpose S6a/S6d Interface Location Updating Procedure In the Location Updating procedure the SGSN 108 or MME 110 informs to the HSS 100 about the current PSM status of the UE and whether it supports PSM status change notifications by means of Update_Location_Request message (ULR):

- A new bit may be defined in the (ULR) flag Attribute Value Pair (AVP): PSM status. For example, the SGSN or MME sending the ULR message to the HSS includes—via a new bit set or unset within the ULR flag AVP—information on whether the UE included or not an "Active Time" information in a registration message. In this way, the HSS sets the PSM status accordingly for the UE. For example the PSM status in the HSS can be set to "using PSM" if the new ULR flag is set (e.g. value "1"), or to "not using PSM" otherwise (e.g. value "0").
- Optionally, a new bit may be defined in Feature_List AVP: PSM Status notifications support in respect to PSM status of the UEs (e.g. a value "1" can indicate that the SGSN or MME can indicate their support for sending new and updated PSM status information to the HSS—e.g. via the new bit referred above—, and a value "0", or its mere absence, would indicate their lack of support for this reporting.

Notification Procedure

The Notification procedure where the HSS 100 is notified about a PSM status change can be mapped to the existing Notify—Request message (NOR):

- New bit may be defined in the NOR_flag AVP: PSM status.

Subscription to Notifications

As explained above, if PSM status is preferably maintained in the HSS 100 only for UEs subscribed to it, the HSS 100 sends a subscription message to register in the SGSN 108 or MME 110 to receive corresponding PSM status change notifications for those UEs. Subscription to such service can be done as part of the Location Updating procedure using Update Location Answer (ULA):

- A new bit may be defined in ULA_flag AVP: "PSM status request"

Or, once the UE is located, the SGSN 108 or MME 110 may be informed about a subscription change using Insert_Subscriber_Data Request (ISD):

- A new bit may be defined in IDR_flag AVP: "PSM status request"

C Interface

MAP Send Routing Information answer may implement an error when the UE is using PSM: Error code "Temporary absent subscriber" can be reused Cx Interface Diameter Location_Information_Request answer (LIA) may implement an error when the UE is using PSM: Error code "DIAMETER_ERROR_IDENTITY_NOT_REGISTERED" can be reused A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A node of a telecommunications network for use as at least one of a Home Location Register and a Home Subscriber Server, the telecommunications network for serving at least one user equipment capable of entering a power saving mode, the network node comprising:
   a receiver configured to receive power saving mode status data relating to a user equipment;
   a status flag determiner configured to set a status flag based on the received power saving mode status data and to store the status flag in a memory; and
   an access controller configured to control access to the user equipment by a terminating service originating in at least one of a Circuit Switched domain and an Internet Protocol Multimedia Subsystem domain of the telecommunications network, wherein access is controlled based on the stored status flag.

2. The node according to claim 1, wherein the access controller is configured to deny access by the terminating service to the user if the stored status flag indicates that the user equipment is in power saving mode.

3. The node according to claim 1, wherein the access controller is configured to allow access to the user equipment by a Short Messaging Service terminating service irrespective of the stored status flag.

4. The node according to claim 1, wherein the receiver is configured to receive the power saving mode status data following a change in the power saving mode status of the user equipment.

5. The node according to claim 1, further comprising an update subscriber configured to send a subscription message to a further node in the telecommunications network for use as at least one of a Serving General Packet Radio Service Support Node and a Mobile Management Entity, wherein the subscription message is for subscribing the node to receive power saving mode status updates for one or more user equipments.

6. The node according to claim 5, wherein the update subscriber is further configured to store in the memory power saving mode data relating to the one or more user equipments.

7. The node according to claim 1, wherein the access controller is configured to control access by the terminating service to the user equipment in response to receiving a request from a gateway of the telecommunications network for obtaining data relating to a server of the telecommunications network assigned to the user equipment.

8. A method for operating a node of a telecommunications network, the node for use as at least one of a Home Location Register and a Home Subscriber Server, the telecommunications network for serving at least one user equipment capable of entering a power saving mode, the method comprising:
   receiving, by a receiver, power saving mode status data relating to a user equipment;
   setting, by a status flag determiner, a status flag based on the received power saving mode status data and storing the status flag in a memory; and
   controlling, by an access controller, access to the user equipment by a terminating service originating in at least one of a Circuit Switched domain and an Internet Protocol Multimedia Subsystem domain of the telecommunications network, wherein access is controlled based on the stored status flag.

9. The method according to claim 8, further comprising denying, by the access controller, access by the terminating service to the user if the stored status flag indicates that the user equipment is in power saving mode.

10. The method according to claim 8, further comprising allowing, by the access controller, access to the user equipment by a Short Messaging Service terminating service irrespective of the stored status flag.

11. The method according to claim 8, further comprising receiving, by the receiver, the power saving mode status data following a change in the power saving mode status of the user equipment.

12. The method according to claim 8, further comprising sending, by an update subscriber, a subscription message to a further node in the telecommunications network for use as at least one of a Serving General Packet Radio Service Support Node and a Mobile Management Entity, wherein the subscription message is for subscribing the node to receive power saving mode status updates for one or more user equipments.

13. The method according to claim 12, further comprising storing, by the update subscriber, power saving mode data relating to the one or more user equipments in the memory.

14. The method according to claim 8, further comprising controlling, by the access controller, access by the terminating service to the user equipment in response to receiving a request from a gateway of the telecommunications network for obtaining data relating to a server of the telecommunications network assigned to the user equipment.

15. A node of a telecommunications network for use as at least one of a Serving General Packet Radio Service Support Node and a Mobile Management Entity, the telecommunications network for serving at least one user equipment capable of entering a power saving mode, the node comprising:
   a receiver configured to receive a registration message from a user equipment, the registration message comprising data relating to a power saving mode of the user equipment;
   a power saving mode status determiner configured to determine the power saving mode status of the user equipment based on the received registration message; and
   a transmitter configured to transmit data relating to the determined power saving mode status of the user equipment to a further node for use as at least one of a Home Location Register and a Home Subscriber Server of the telecommunications network.

16. The node according to claim 15, wherein the power saving mode status determiner is configured to determine that the user equipment is in power saving mode status if the registration message comprises data relating to an Active Time, and to determine that the user equipment is not in power saving mode status if the registration message does not comprise data relating to an Active Time.

17. The node according to claim 15, further comprising a power saving mode updater configured to determine whether the power saving mode of the user equipment has changed based on the received registration message.

18. The node according to claim 17, wherein the power saving mode updater is configured to control the transmitter to transmit the data relating to the determined power saving mode of the user equipment to the further node if the power saving mode of the user equipment has changed.

19. The node according to claim 17, wherein the power saving mode updater is configured to determine whether the power saving mode of the user equipment has been updated based on whether the registration message comprises an Active Time.

20. The node according to claim 15, wherein the power saving mode status determiner is configured to store the power saving mode status of the user equipment in the memory.

21. The node according to claim 20, further comprising a power saving mode handover controller configured to control the transmitter to transmit the power saving mode status of the user equipment to a further node for use as at least one of a Serving General Packet Radio Service Support Node and a Mobile Management Entity serving the user equipment.

22. The node according to claim 20, wherein the power saving mode status determiner is configured to store the power saving mode status of the user equipment as part of the Mobility Management context.

23. The node according to claim 15, wherein the receiver configured to receive a subscription message from a further node for use as at least one of a Home Location Register and a Home Subscriber Server, the subscription message for subscribing the further node to power saving mode status updates for at least one user equipment.

24. The node according to claim 23, wherein the power saving mode status updater is configured to control the transmitter to transmit the data relating to the determined power saving mode of the user equipment to one or more further nodes from which a subscription message has been received.

25. A method for operating a node of a telecommunications network, the node for use as at least one of a Serving General Packet Radio Service Support Node and a Mobile Management Entity, the telecommunications network for serving at least one or more user equipment capable of entering a power saving mode, the method comprising:
- receiving, by a receiver, a registration message from a user equipment, the registration message comprising data relating to a power saving mode of the user equipment;
- determining, by a power saving mode status determiner, the power saving mode status of the user equipment based on the received registration message; and
- transmitting, by a transmitter, data relating to the determined power saving mode status of the user equipment to a further node for use as at least one of a Home Location Register and a Home Subscriber Server of the telecommunications network.

26. The method according to claim 25, wherein the determining comprises determining that the user equipment is in power saving mode status if the registration message comprises data relating to an Active Time, and determining that the user equipment is not in power saving mode status if the registration message does not comprise data relating to an Active Time.

27. The method according to claim 25, further comprising determining, by a power saving mode updater, whether the power saving mode of the user equipment has changed based on the received registration message.

28. The method according to claim 27, further comprising controlling, by the power saving mode updater, the transmitter to transmit the data relating to the determined power saving mode of the user equipment to the further node if the power saving mode of the user equipment has changed.

29. The method according to claim 25, further comprising determining, by a power saving mode updater, whether the power saving mode of the user equipment has been updated based on whether the registration message comprises an Active Time.

30. The method according to claim 25, wherein the power saving mode status determiner is configured to store the power saving mode status of the user equipment in the memory.

31. The method according to claim 30, further comprising controlling, by a power saving mode handover controller the transmitter to transmit the power saving mode status of the user equipment to a further node for use as at least one of a Serving General Packet Radio Service Support Node and a Mobile Management Entity serving the user equipment.

32. The method according to claim 30, further comprising storing, by the power saving mode status determiner, the power saving mode status of the user equipment as part of the Mobility Management context.

33. The method according to claim 25, further comprising receiving, by the receiver, a subscription message from a further node for use as at least one of a Home Location Register and a Home Subscriber Server, the subscription message for subscribing the further node to power saving mode status updates for one or more user equipments.

34. The method according to claim 33, further comprising controlling, by the power saving mode status updater, the transmitter to transmit the data relating to the determined power saving mode of the user equipment to at least one further node from which a subscription message has been received.

* * * * *